United States Patent
Liu et al.

(10) Patent No.: US 10,089,385 B2
(45) Date of Patent: *Oct. 2, 2018

(54) METHOD AND APPARATUS FOR ASYNCHROINZED DE-SERIALIZATION OF E-R MODEL IN A HUGE DATA TRUNK

(71) Applicant: INTERNATIONAL BUSINESS MACHINES CORPORATION, Armonk, NY (US)

(72) Inventors: Xin Peng Liu, Beijing (CN); Lei Shi, Beijing (CN); Hao Wan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,290

(22) Filed: Jan. 31, 2017

(65) Prior Publication Data

US 2017/0140032 A1    May 18, 2017

Related U.S. Application Data

(63) Continuation of application No. 14/038,280, filed on Sep. 26, 2013, now Pat. No. 9,600,562.

(30) Foreign Application Priority Data

Sep. 28, 2012  (CN) .......................... 2012 1 0371278

(51) Int. Cl.
   *G06F 17/30* (2006.01)
(52) U.S. Cl.
   CPC ...... *G06F 17/30604* (2013.01); *G06F 17/303* (2013.01); *G06F 17/30339* (2013.01); *G06F 17/30345* (2013.01)

(58) Field of Classification Search
   CPC ............. G06F 17/30604; G06F 17/303; G06F 17/30339; G06F 17/30345
   See application file for complete search history.

(56) References Cited

U.S. PATENT DOCUMENTS

| | | | |
|---|---|---|---|
| 5,369,761 | A | 11/1994 | Conley et al. |
| 6,076,090 | A | 6/2000 | Burroughs et al. |

(Continued)

FOREIGN PATENT DOCUMENTS

| | | |
|---|---|---|
| CA | 2468406 A1 | 11/2004 |
| CN | 102142024 A | 3/2011 |
| WO | 0227533 A1 | 4/2002 |

OTHER PUBLICATIONS

Google Search "determining minimum reference number of strong relationship table", retrieved from Internet: https://www.google.com/; downloaded Jul. 1, 2016; 2 pgs.

(Continued)

*Primary Examiner* — Cam-Y Truong
(74) *Attorney, Agent, or Firm* — Cantor Colburn LLP; Maeve Carpenter

(57) ABSTRACT

A computer-implemented method for importing data for an Entity Relationship (E-R) model includes receiving an exported E-R model data file of the E-R model, and determining a dependency type correlation of an entity and importing the entity directly if the determined dependency type is one of weak correlation and no correlation. The method also includes determining whether the imported entity with no correlation or weak correlation affects an entity recorded in a strong correlation table, and storing the entity in the strong correlation table until a minimum reference number of a strong correlation is satisfied if the dependency type correlation is strong. The method further includes importing the entity recorded in the strong correlation table, and deleting the entity recorded in the strong (Continued)

correlation table from the strong correlation table when the imported entity with no correlation or weak correlation affects an entity recorded in the strong correlation table.

7 Claims, 7 Drawing Sheets

(56) References Cited

U.S. PATENT DOCUMENTS

| | | |
|---|---|---|
| 6,502,098 B2 | 12/2002 | Lau |
| 7,191,186 B1 | 3/2007 | Pullen |
| 7,613,695 B1 * | 11/2009 | Solomon .............. G06Q 10/103 |
| 8,095,561 B2 | 1/2012 | Lu et al. |
| 8,131,728 B2 | 3/2012 | Kingsbury et al. |
| 8,825,601 B2 | 9/2014 | Huynh Huu et al. |
| 2002/0169788 A1 | 11/2002 | Lee et al. |
| 2004/0044687 A1 | 3/2004 | Vachuska et al. |
| 2006/0190814 A1 | 8/2006 | Collie et al. |
| 2008/0243767 A1 | 10/2008 | Naibo et al. |
| 2009/0327343 A1 | 12/2009 | McCormack et al. |
| 2011/0113074 A1 | 5/2011 | Abrams et al. |
| 2011/0264703 A1 | 10/2011 | Lydick et al. |

OTHER PUBLICATIONS

Google Search "weak correlation table E-R model", 2 pgs., retrieved from Internet: https://www.google.com/search?q=weak+correlation+table+E-R+model&biw=1280&bih=. . . ; downloaded Apr. 12, 2016; 2 pgs.

* cited by examiner

METHOD AND APPARATUS FOR ASYNCHROINZED DE-SERIALIZATION OF E-R MODEL IN A HUGE DATA TRUNK

DOMESTIC PRIORITY

This application claims priority to U.S. Non Provisional Application Ser. No. 14/038,280 dated Sep. 26, 2013 which claims priority under 35 U.S.C. § 119 to Chinese patent application CN 201210371278.0, filed Sep. 28, 2012, the contents of which in its entirety are herein incorporated by reference.

BACKGROUND

Embodiments disclosed herein relate to the field of database technology, and, more specifically, to a method and system for importing E-R model data utilizing dependency information in an E-R model data schema.

Entity-Relationship data model (E-R) model is a semantic model, which is very useful in the mapping from meanings of the real world to conceptual patterns. The E-R model involves three basic concepts: an entity set, a relationship set, and properties.

Generally speaking, there are three possible scenarios for the correlations between entities in the E-R model data. The first scenario is a strong correlation, which means that a certain entity type is linked to N (N≥1) instances of another certain entity type. In other words, a certain entity has a property that is another entity type, whose number of the property being at least 1. For example, the entity "student" has a property "name," while "name" itself is also an entity, which further comprises properties such as "surname," "first name," "former name," etc. Since every student must have at least one name, the entity type "student" is strongly correlated to the entity type "name." The second scenario is a weak correlation, which means that a certain entity type is linked to N (N>=0) instances of another certain entity type. For example, the entity type "student" has a property "duty," while the "duty" itself is also an entity type having a plurality of properties (for example "start time," "tenure"). Since not every student takes a certain duty, the entity type "student" is weakly correlated to the entity type "duty." The third scenario is no correlation. In other words, no correlation means no correlation exists between two entity types.

SUMMARY

In view of the above problems, one of the benefits of embodiments disclosed herein lies in providing a method or system for reducing consumption of storage resources when importing E-R model data. Another benefit of embodiments disclosed herein lies in providing a method or system that enables model elements (entities) to be imported as soon as possible when importing E-R model data to thereby reduce time consumed for importing. The above benefits apparently have significance of independent existence; even in the case of potentially or already occurrence, embodiments disclosed herein can, but not necessarily, provide all of the above benefits simultaneously.

According to one aspect of embodiments disclosed herein, there is provided a method for importing E-R model data, comprising: receiving an exported E-R model data file and a data schema of the E-R model; determining a dependency type of each entity in the data file based on the data schema, wherein the dependency type comprises at least one of the followings: no correlation, weak correlation, or strong correlation; and correspondingly importing each entity in the E-R model data file based on the determined dependency type.

According to another aspect of embodiments disclosed herein, a computer program product for importing E-R model data is provided. The computer program product comprises: a computer readable storage medium having program code embodied therewith, where the program code executable by a processor for: receiving an exported E-R model data file and a data schema of the E-R model; determining a dependency type of an entity in the data file based on the data schema, wherein the dependency type corresponds to at least one of no correlation, weak correlation, and strong correlation; and importing the entity in the E-R model data file based on the determined dependency type.

According to another aspect of embodiments disclosed herein, there is provided a system for importing E-R model data, comprising: a receiving device configured to receive an imported E-R model data file and a data schema of the E-R model; a dependency determining device configured to determine a dependency type of each entity in the data file based on the data schema, wherein the dependency type comprises at least one of the followings: no correlation, weak correlation, or strong correlation; and an importing device configured to correspondingly import each entity in the E-R model data file based on the determined dependency type.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
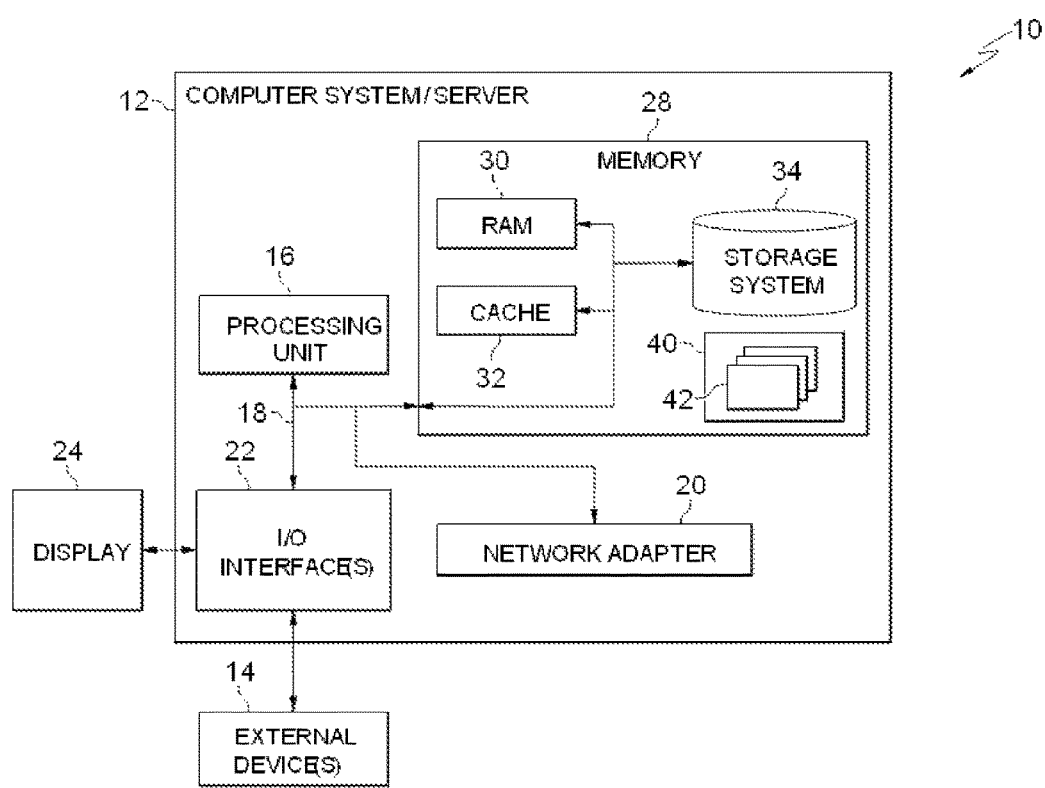
FIG. 1 shows a block diagram of an example computer system/server 12 which is applicable to implement embodiments disclosed herein.

At present, as the entity-relationship (E-R model) is widely used in the field of information technology, particularly in the field of database, a single server usually stores a considerable amount of E-R model-based data, and most systems have a demand for backing up and archiving the mass E-R model data. On the other hand, it is beneficial to be able to transfer the E-R model data between different systems. Both of these aspects use export and import of serialized E-R model data. In contemporary systems, when importing E-R model data, regardless of the dependency between entities, an entity cannot be imported until all other entities on which the entity depends have been imported. Moreover, an E-R data file exported from a system is usually not organized in an order as required by the system into which the file is to be imported. A significant limitation arising therefrom lies in that when a very large E-R data file is exported from one system to another, the data structure of the E-R data file (especially the sequence of the entities to be imported) has to be reorganized according to the system into which the file is to be imported. While this reorganization prevents errors from occurring to the correlation relationship between entities after importation (especially violation of integrity restriction of the model), it is time-consuming and will consume a great number of storage resources to store the entities that are read from the E-R data file but cannot be imported promptly.

According to the method or system of embodiments disclosed herein, corresponding importing mechanisms are adopted based on different dependencies of different entities, without the need of re-sorting and organizing massive E-R model data with respect to the characteristics of a to-be-imported system at the client, the entities in the E-R model data can be imported as soon as possible, and further, considerable storage resources for buffering the entities that have been read but cannot be directly imported can be saved.

Some embodiments will be described in more detail with reference to the accompanying drawings, which illustrate embodiments of the present invention. However, the present invention can be implemented in various ways, and thus should not be construed to be limited to the embodiments disclosed herein. On the contrary, those embodiments are provided for the thorough and complete understanding of the present invention, and completely conveying the scope of the present invention to those skilled in the art.

As will be appreciated by one skilled in the art, features disclosed herein may be embodied as a system, method or computer program product. Accordingly, various embodiments disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, various embodiments disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for features disclosed herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described below with reference to flowchart illustrations and/or block diagrams of methods, apparatus (systems) and computer program products according to embodiments disclosed herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, shown is an example computer system/server 12 that is applicable to implement embodiments disclosed herein. Computer system/server 12 shown in FIG. 1 is only illustrative and is not intended to suggest any limitation as to the scope of use or functionality of the embodiments described herein.

In FIG. 1, computer system/server 12 takes the form of a general-purpose computing device. The components of computer system/server 12 may include, but are not limited to, one or more processors or processing units 16, a system memory 28, and a bus 18 that couples various system components including system memory 28 and processing unit 16.

Bus 18 represents one or more of several types of bus structures, including a memory bus or a memory controller, a peripheral bus, an accelerated graphics port, and a processor or local bus using any of a variety of bus architectures. By way of example, and without limitation, such architectures include Industry Standard Architecture (ISA) bus, Micro Channel Architecture (MAC) bus, Enhanced ISA bus, Video Electronics Standards Association (VESA) local bus, and Peripheral Component Interconnect (PCI) bus.

Computer system/server 12 typically includes a variety of computer readable media. Such media may be any available media that is accessible by computer system/server 12, and it includes both volatile and non-volatile media, removable and non-removable media.

System memory 28 can include computer readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown in FIG. 1 and typically referred to as a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each driver can be connected to bus 18 by one or more data media interfaces. Memory 28 may include at least one program product having a set (e.g., at least one) of program modules that are configured to carry out the functions of respective embodiments disclosed herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be implemented in a networking environment. Program modules 42 generally carry out the functions and/or methodologies of embodiments disclosed herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a wide area network (WAN), and/or a public network (e.g., the Internet) via network adapter 20. As illustrated, network adapter 20 communicates with other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data backup storage systems, etc.

Figure 2:
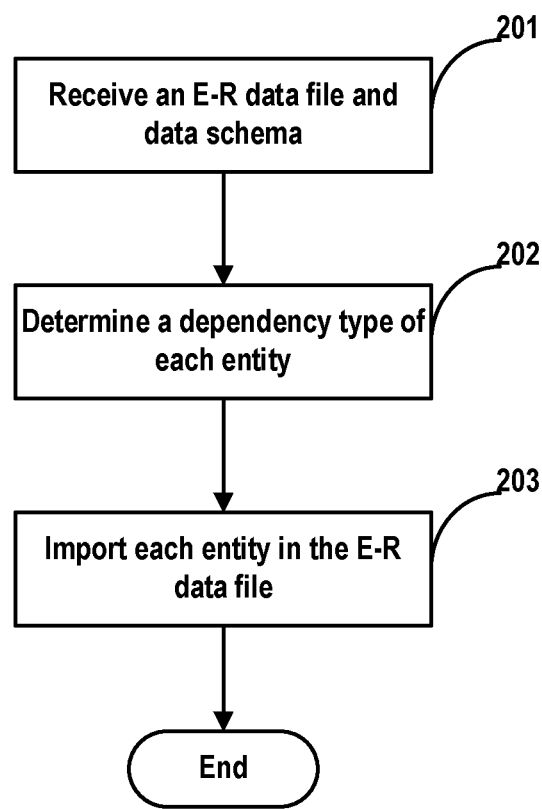
FIG. 2 shows a flowchart of a method for importing E-R model data according to embodiments disclosed herein.

FIG. 2 shows a flowchart of a method for importing E-R model data according to one embodiment disclosed herein. The method as shown in FIG. 2 starts at block 201. In block 201, an exported E-R model data file and a data schema of the E-R model are received. The exported E-R model data file refers to a formatted E-R model data file that is generated after exporting the original E-R model-based data in any source system. Those skilled in the art would appreciate that the exported E-R model data file may be embodied as an XML (Extensible Markup Language) file, an EMF (Eclipse Modeling Framework) file, or a relationship-type database table, etc. As to how to export the E-R model data file from a source system, it belongs to prior art and will not be detailed here. The data schema of the E-R model refers to the information characterizing the correlation relationship (or dependency) between entity types in the E-R model. The data schema of the E-R model is set up while the original E-R model-based data is created. In block 201, merely the exported E-R model data file and the data schema of the E-R model are received.

Next, the method as shown in FIG. 2 proceeds to block 202 to determine a dependency type of each entity in the data file based on the data schema. The dependency type corresponds to at least one of the following: no correlation, weak correlation, or strong correlation. The terms "no correlation," "weak correlation," and "strong correlation" are described above. Once the data schema of the E-R model is obtained in block 201, a dependency type of each entity type can be determined therefrom. In block 202, through reading each entity in the exported formatted E-R model data file in sequence in accordance with an organization sequence of file contents per se, a dependency type of a corresponding entity type is determined based on the data schema of the E-R model. It should be noted that the dependency type is directed to each entity type. For example, the entity type "student" is strongly correlated to the entity type "name."

In block 203, each entity in the E-R model data file is correspondingly imported based on the determined dependency type. For example, after the dependency of a certain entity type in the E-R model data file is determined to be strong correlation, the entity will be imported using strong correlation. If the dependency of a certain entity type in the E-R model data file is determined to be weak correlation, the entity will be imported using weak correlation. Entities in the E-R model data file are imported one by one, until all entities (and properties of the entities) in the E-R model data file are imported and importation of the entire E-R model data is completed. According to one embodiment disclosed herein, weakly-correlated entities and not-correlated entities can be directly imported in block 203; while for strongly-correlated entities, they are first stored in a strong correlation table that may comprise multiple possible physical storage modes, for example, hard disk, cache, or any form of temporary storage, etc., and importing is deferred until a minimum reference number of the strongly-correlated entities is satisfied. The "minimum reference number" means the number of correlated entities to which a certain strongly-correlated entity is at least correlated as defined in the E-R data schema. For example, the entity type "student" is defined as being at least correlated to one entity type "name," thus for the strongly-correlated entity "student," its minimum reference number with respect to the entity "name" is 1. As to specific embodiments of performing entity importing operation based on various dependency types, they will be described in more detail with reference to FIGS. 3-5.

It may be seen from the method shown in FIG. 2 that embodiments described herein adopt different entity importing mechanisms, utilizing the determined dependency type of each entity, such that each entity in the E-R model data can be imported as soon as possible without waiting for the importation of other entities associated with it. Considerable storage resources for caching the entities that have been read but cannot be directly imported may therefore be saved.

Figure 3:
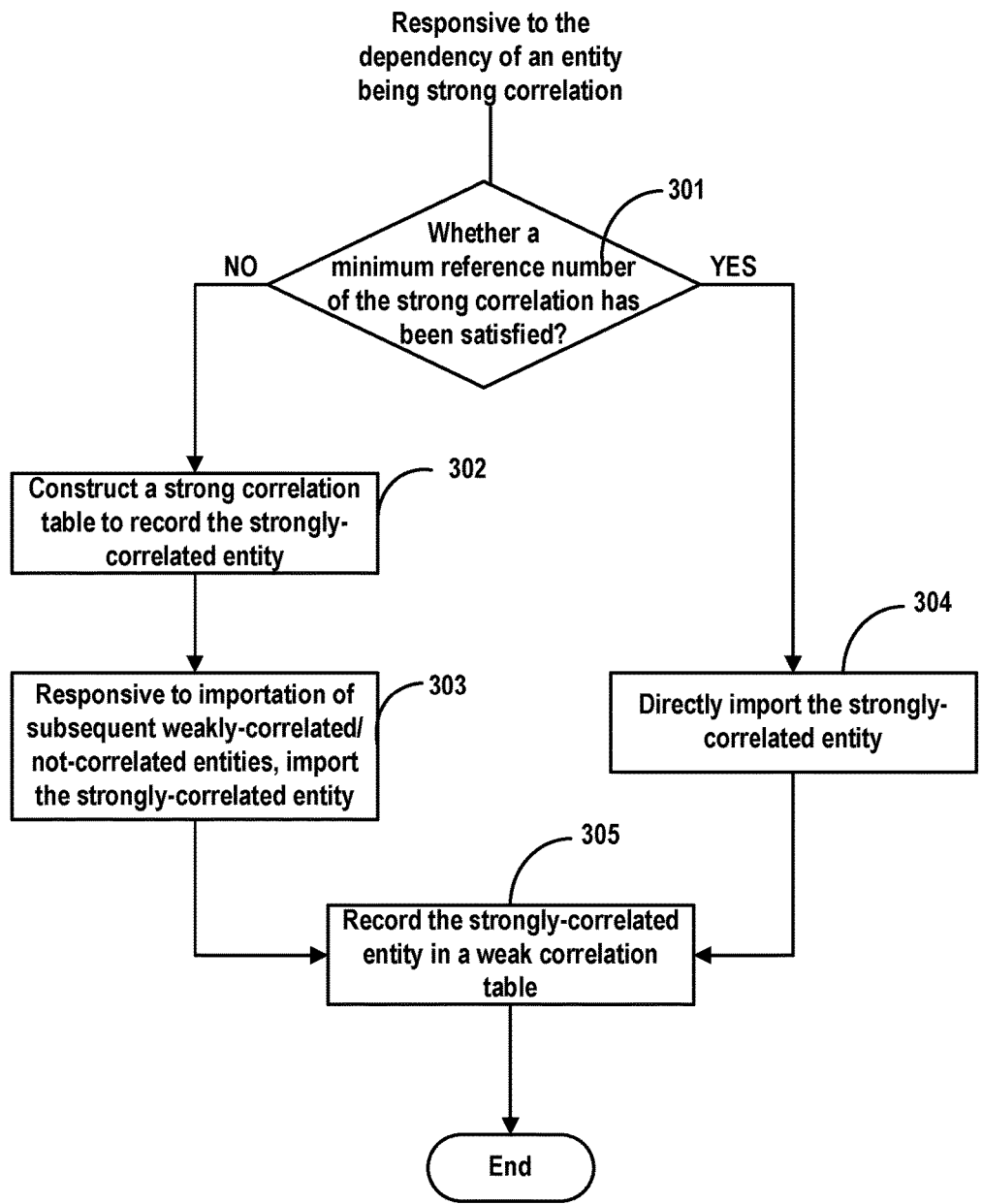
FIG. 3 is a flowchart illustrating a method of importing strongly-correlated entities according to embodiments disclosed herein.

FIG. 3 is a flowchart illustrating a method of importing strongly-correlated entities according to another embodiment disclosed herein. Specifically, FIG. 3 shows a flowchart of an importation operation for a strongly-correlated entity. In block 301, it is determined whether the minimum reference number for the determined strongly-correlated entity has been satisfied.

If it is determined that the minimum reference number has been satisfied, then the method proceeds to block 304 to directly import the strongly-correlated entity. It may be understood that although a certain entity is regarded as a strongly-correlated entity based on the E-R data schema, the strongly-correlated entity may no longer be regarded as an actual strongly-correlated entity, if other previously imported entities cause the strong correlation restriction condition for the strongly-correlated entity to be satisfied. In such cases, the entity is directly imported in block 304.

If it is determined in block 301 that the minimum reference number has not been satisfied, then the method proceeds to block 302 to construct a strong correlation table to record strong correlation reference information of the entity. In other words, if the strong correlation restriction condition of a certain strongly-correlated entity has not been satisfied, at this point, the strongly-correlated entity is not directly imported (otherwise, E-R data structure error will arise), and instead the strongly-correlated entity and the strong correlation reference information is first recorded in the strong correlation table. It should be noted that, the "strong correlation table" is a functional description, and its physical storage locations have multiple possibilities, which will not be defined here. Moreover, the "strong correlation table" does not mean that it must be embodied in the form of a traditional database table. Instead, any information recording mechanism can implement the function of "a strong correlation table." It should be further noted that, "creating a strong correlation table" in block 302 is merely performed when processing the first strongly-correlated entity in the E-R model data file. For subsequent strongly-correlated entities, it would be unnecessary to create a new strong correlation table again, and they are simply recorded in the existing strong correlation table.

Next, the flow as shown in FIG. 3 proceeds to block 303 of importing the strongly-correlated entity responsive to the importation of subsequent weakly-correlated or not-correlated entities. It is not necessary to import the strongly-correlated entity for each time that a subsequent weakly-correlated entity or not-correlated entity is imported. "Responsive to" in block 303 implies determining whether the importation of subsequent weakly-correlated or not-correlated entities will cause the restriction condition for the strongly-correlated entity (i.e., "minimum reference number") to be satisfied. If the importation will not cause the restriction condition for the strongly-correlated entity (i.e., "minimum reference number") to be satisfied, the flow ends and will not proceed to block 305. If the importation causes the restriction condition for the strongly-correlated entity (i.e., "minimum reference number") to be satisfied, the flow might (but does not necessarily) proceed to block 305. Hereinafter, the flows of importing weakly-correlated entities and not-correlated entities will be described in detail with reference to FIG. 4 and FIG. 5.

Next, both blocks 303 and 304 proceed to block 305 to record the strongly-correlated entity in a weak correlation table. It should be noted that it is not necessary to record the strongly-correlated entity in the weak correlation table whenever the strongly-correlated entity is subsequently imported, and in some embodiments, block 305 includes determining whether it is necessary to record the imported strongly-correlated entity in the weak correlation table. If it is unnecessary to record the imported strongly-correlated entity into the weak correlation table, neither block 304 nor block 303 will proceed to block 305. It will be likewise described in detail with regard to the flows of importing weakly-correlated entities and not-correlated entities with reference to FIG. 4 and FIG. 5. According to one embodiment, the record of the strongly-correlated entity is deleted from the strong correlation table between block 303 and block 305, although such is not shown in FIG. 3 for the sake of simplicity.

Figure 4:
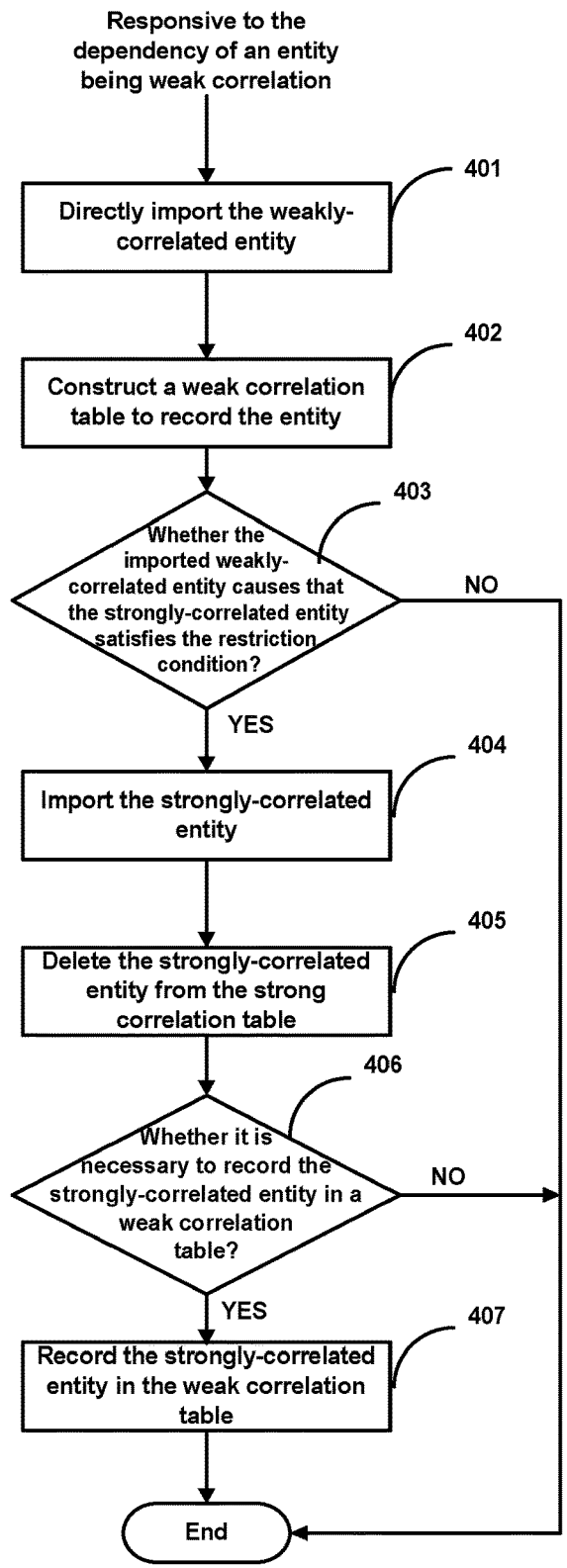
FIG. 4 is a flowchart illustrating a method of importing weakly-correlated entities according to embodiments disclosed herein.

FIG. 4 is a flowchart illustrating a method of importing weakly-correlated entities according to one embodiment disclosed herein. In block 401, the weakly-correlated entity is directly imported. Because a restriction condition for a weakly-correlated entity is not compulsory (which may be 0), direct importation of the weakly-correlated entity will not cause an E-R model data structure error. Next, in block 402, a weak correlation table is constructed to record weak correlation reference information of the weakly-correlated entity. Likewise, similar to "being recorded in the strong correlation table," the "being recorded in the weak correlation table" here is merely directed to processing the first weakly-correlated entity in the E-R data schema file, and other subsequent weakly-correlated entities may be directly recorded in the existing weak correlation table. Moreover, the "weak correlation table" is also merely a functional description, which has various possible physical locations and may even be stored in the same physical data table with the "strong correlation table." Additionally, the "weak correlation table" is not necessarily embodied in the form of a traditional database table.

Next, starting at block 403, the following functions are performed: importing a strongly-correlated entity that has been read previously, but has not yet been imported based on the importation of the weakly-correlated entity; and updating the strong correlation table. Specifically, in block 403, it is determined whether the imported weakly-correlated entity causes that a certain strongly-correlated entity satisfies a restriction condition (i.e., "minimum reference number"). If satisfied, then the flow proceeds to block 404 to import the strongly-correlated entity which satisfies the restriction condition and has been pre-recorded in the strong correlation table. Because the strongly-correlated entity has been imported, in block 405, the imported strongly-correlated entity is deleted from the strong correlation table. For example, a strongly-correlated entity "student" in the E-R model data file is first read, whose restriction condition is:

strongly correlated to at least one weakly-correlated entity "name." Then, the entity "student" and its strong correlation reference information are first recorded in the strong correlation table. Next, the weakly-correlated entity "name" in the E-R model data file is read, the entity "name" is directly imported, and the entity "name" and its weak correlation reference information are recorded in the weak correlation table. Meanwhile, it is determined that due to the importation of the entity "name," the restriction condition (i.e., "minimum reference information") for the strongly-correlated entity "student" has been satisfied. Therefore, the strongly-correlated entity "student" is imported and meanwhile the record of the "student" is deleted from the strong correlation table. It should be noted that if a strongly-correlated entity is simultaneously strongly correlated to more than one other entities, then even if one of the correlated entities is imported, the restriction condition for the strongly-correlated entity is still not satisfied.

The flow of FIG. 4 proceeds to block 406 to determine whether it is necessary to record the strongly-correlated entity as imported in block 404 in the weak correlation table. Responsive to the judgment result as yes in block 406, the strongly-correlated entity is recorded in the weak correlation table in block 407. For example, it is read from the E-R model data file that an instance of the strongly-correlated entity "student 1" is correlated to instances of two entity types of "name" in the data file (suppose the student has two names, "name 1" and "name 2"), then after importing the instance of one "name" entity thereof, although the instance of the strongly-correlated entity "student 1" may be imported and its record may be deleted from the strong correlation table, as previously mentioned, there is still an instance correlated to the "name" entity of "student 1" that has not been imported yet. Therefore, it is necessary to record "student 1" in the weak correlation table.

According to one embodiment disclosed herein, after all entities in the E-R model data file are completely processed (i.e., all entities are imported), an update request is generated for all rows in the weak correlation table to uniformly update the dependency information for each imported entity. According to another embodiment disclosed herein, responsive to processing a correlated entity as recorded in the weak correlation table, the dependency information of the imported entity is updated promptly, and meanwhile its relevant record in the weak correlation table is deleted.

Returning to block 403, if it is determined as no, then the flow shown in FIG. 4 ends.

Figure 5:
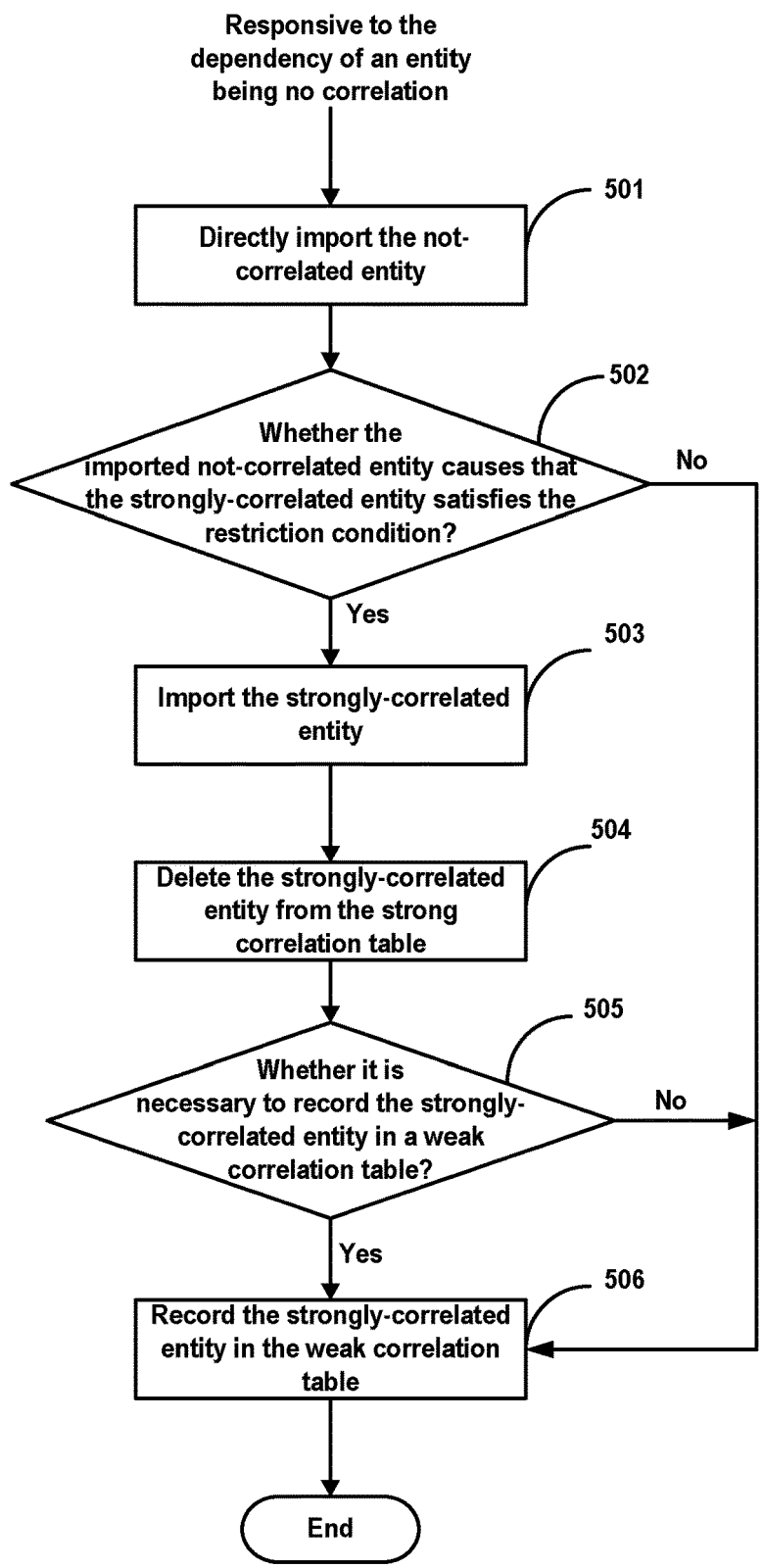
FIG. 5 is a flowchart illustrating a method of importing no-correlation entities according to embodiments disclosed herein.

FIG. 5 is a flowchart illustrating a method of importing not-correlated entities according to one embodiment disclosed herein. In block 501, the not-correlated entity is directly imported. Next, starting from block 502, blocks similar to blocks 403-407 in FIG. 4 are performed. However, FIG. 5 has no block similar to block 402 in FIG. 4, because a not-correlated entity will not be correlated to any other entity. Therefore, it would be unnecessary to record the entity and its dependency information. The reason that blocks 502-506 are similar to steps 403-407 in FIG. 4 lies in that the importation of the not-correlated entity likewise might possibly cause the restriction condition for a previously read strongly-correlated entity to be satisfied to thereby trigger the importation of the strongly-correlated entity, delete the strongly-correlated entity and its reference information from the strong correlation table where necessary, and record it in the weak correlation table.

Figure 6:
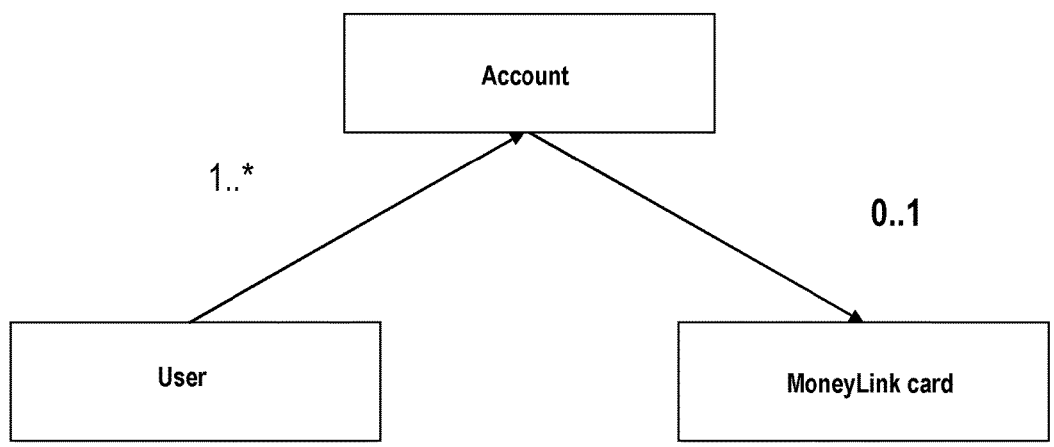
FIG. 6 shows a data schema of importing E-R model data according to a specific usage scenario of embodiments disclosed herein.

FIG. 6 shows a data schema of importing E-R model data according to a particular usage scenario. The embodiments described herein may be better understood with reference to this scenario. It can be seen from FIG. 6 that three entity types exist: "user," "account," and "MoneyLink card". After a bank user registers, there is at least one account, and there may be multiple accounts. Each account may be correlated to one MoneyLink card, or may not be correlated to any MoneyLink card. Thus, the entity type "user" is strongly correlated to the entity type "account," which is represented by an arrow pointing from the "user" to "account" and "1. . . *" in FIG. 6, wherein "1. . . *" denotes being at least correlated to one, i.e., the minimum reference number is 1. The entity type "account" is weakly correlated to the entity type "MoneyLink card," which is represented by an arrow pointing from the "account" to the "MoneyLink card" and "0 . . . 1," wherein "0 . . . 1" denotes that it may be not correlated or correlated to one. The dependency of the entity type "MoneyLink card" belongs to a not-correlated entity.

Below, it is assumed that an E-R model data file has been exported from some system as follows (expressed with slant):

[user id: 1 correlated account id:1 correlated account id: 2]

[account id:1 correlated MoneyLink card id:1]

[account id:2 correlated MoneyLink card id:2]

[MoneyLink card id: 1]

[MoneyLink card id: 2]

Thus, user instance 1 is correlated to account instance 1 and instance 2, account instance 1 is correlated to MoneyLink card instance 1, and account instance 2 is correlated to MoneyLink card instance 2. Those skilled in the art should appreciate that the above E-R model data file is merely an example used to simply present key contents of the data file, and it does not limit the actual exported data file to this format. The E-R model data file may be embodied in various formats such as XML, EMF, etc.

According to one embodiment, after the E-R model data schema as shown in FIG. 6 and the above given E-R model data file are received, importation of the E-R model data starts. First, user 1 is read from the E-R model data file. From the E-R model data schema in FIG. 6, it is determined that the entity type "user" and the entity type "account" have a strong correlation with the minimum reference number being 1, and then a check is performed to determine whether the minimum reference number for the strong correlation has been satisfied. Since the user has to be referred to at least one account, the minimum reference number is not satisfied, so user 1 is written into the strong correlation table (as shown in Table 1 below).

TABLE 1

| STRONG CORRELATION TABLE | | |
|---|---|---|
| ID | Strong correlation type | Strong correlation ID |
| User 1 | Account | Account 1, Account 2 |

Those skilled in the art should understand that the above strong correlation table may be linked to the E-R model data schema as shown in FIG. 6 in a "foreign key reference" manner, to monitor whether the strong correlation restriction condition for user 1 is satisfied.

Next, account 1 is read. From the data schema of FIG. 6, it is determined that the account 1 has a weak correlation. Therefore, account 1 is directly imported, and the weak correlation of account 1 to MoneyLink card 1 is added into the weak correlation table, as shown in Table 2 below.

TABLE 2

WEAK CORRELATION TABLE

| ID | Weak correlation type | Weak correlation ID |
|---|---|---|
| Account 1 | MoneyLink card | MoneyLink card 1 |

Meanwhile, the strong correlation table is checked to find that the minimum correlation number restriction for user 1 in terms of account properties has been satisfied, thus user 1 is imported, and user 1 is deleted from the strong correlation table. Since it is determined from the E-R model data file (or from the records in the strong correlation table) that user 1 is actually correlated to account 2 in addition to being correlated to account 1, user 1 is added to the weak correlation table. The updated weak correlation table is shown in Table 3.

TABLE 3

UPDATED WEAK CORRELATION TABLE

| ID | Weak correlation type | Weak correlation ID |
|---|---|---|
| Account 1 | MoneyLink card | MoneyLink card 1 |
| User 1 | Account | Account 2 |

Next, account 2 is read from the E-R model data file. It is derived from the data schema shown in FIG. 6 that account 2 is also weakly correlated. Therefore, account 2 is directly imported, and its weak correlation reference to MoneyLink card 2 is added into the weak correlation table. The updated weak correlation table is shown in Table 4.

TABLE 4

WEAK CORRELATION TABLE AFTER SECOND UPDATE

| ID (Entity Instance) | Weak correlation type | Weak correlation ID |
|---|---|---|
| Account 1 | MoneyLink card | MoneyLink card 1 |
| User 1 | Account | Account 2 |
| Account 2 | MoneyLink card | MoneyLink card 2 |

Next, MoneyLink card 1 is read from the E-R model data file. It is found from the E-R data schema as shown in FIG. 6 that its dependency is no correlation, and thus it is directly imported. Next, MoneyLink card 2 is read from the E-R model data file. It is found from the E-R data schema as shown in FIG. 6 that its dependency is also no correlation. Therefore, it is also directly imported.

Next, it is found that the E-R model data file has been completely scanned, and all entity instances have been imported (as shown in Table 5). Therefore, an update request is generated for the three rows of data information in the weak correlation table shown in Table 4, and the three rows of data information are imported, to thereby accomplish the importation of all E-R model data.

TABLE 5

TABLE OF ALL IMPORTED ENTITIES

| ID (entity instance) |
|---|
| Account 1 |
| User 1 |
| Account 2 |
| MoneyLink Card 1 |
| MoneyLink Card 2 |

In order to better describe the effect of the above scenario of importing E-R model data, a brief discussion of the mechanism used by the prior art to process the same scenario will now be provided. In the prior art, the importation cannot be performed until a complete memory model is set up. Step 1: read user 1; create an object User 1 in the memory; and because two correlations are not yet present in the memory, User 1 cannot be imported but stays in the memory. Step 2: read Account 1; create an object Account 1 in the memory, and set it to the account properties of User 1. Because Account 1 also has a correlation not present in the memory, Account 1 cannot be imported either but stays in the memory. Step 3: read Account 2; the practice is similar to the preceding step, i.e., creating Account 2 in the memory, setting it to the account properties of User1, without being imported. Step 4: read MoneyLink card 1; create an object Card 1 in the memory, and set it to the MoneyLink card properties of Account 1. At this point, because Card 1 has no correlation, it may be directly imported. Account 1 may also be imported because all correlations are in place due to the importation of Card 1. However, User 1 cannot be imported because Account 2 has not been imported yet. Step 5: read MoneyLink card 2; create an object Card 2 in the memory, and set it to the MoneyLink card properties of Account 2. At this point, because Card 2 has no correlation, it may be directly imported; Account 2 may also be imported because all correlations are in place due to the importation of Card 2. Finally, likewise, User 1 is finally imported because all correlations are in place due to the importation of Account 2. This method will occupy very large memory storage, and when the E-R model is extremely large, the processing will cause memory to overflow.

According to another prior art practice, the to-be-imported entity instances are ordered based on the dependencies of correlations, and then the entity instances are imported sequentially. First, the E-R model data file is re-ordered based on an ordering algorithm, and a new E-R model data file is generated as below (expressed in slant):

[MoneyLink card id: 1]
[MoneyLink card id: 2]
[account id:1 correlated MoneyLink card id:1]
[account id:2 correlated MoneyLink card id:2]
[user id: 1 correlated account id:1 correlated account id: 2]

Then, the E-R model data are imported in accordance with the order in the ordered E-R model data file. According to the order after ordering, there will be no wait depending on the correlation relationship. However, such practice is quite time-consuming during the ordering procedure; moreover, an intermediate large copy will be generated, which will occupy a relatively large space in the hard disk.

From the above scenario, it may be seen that embodiments disclosed herein may overcome the problems in these two prior art mechanisms when performing importation of E-R model data.

Figure 7:
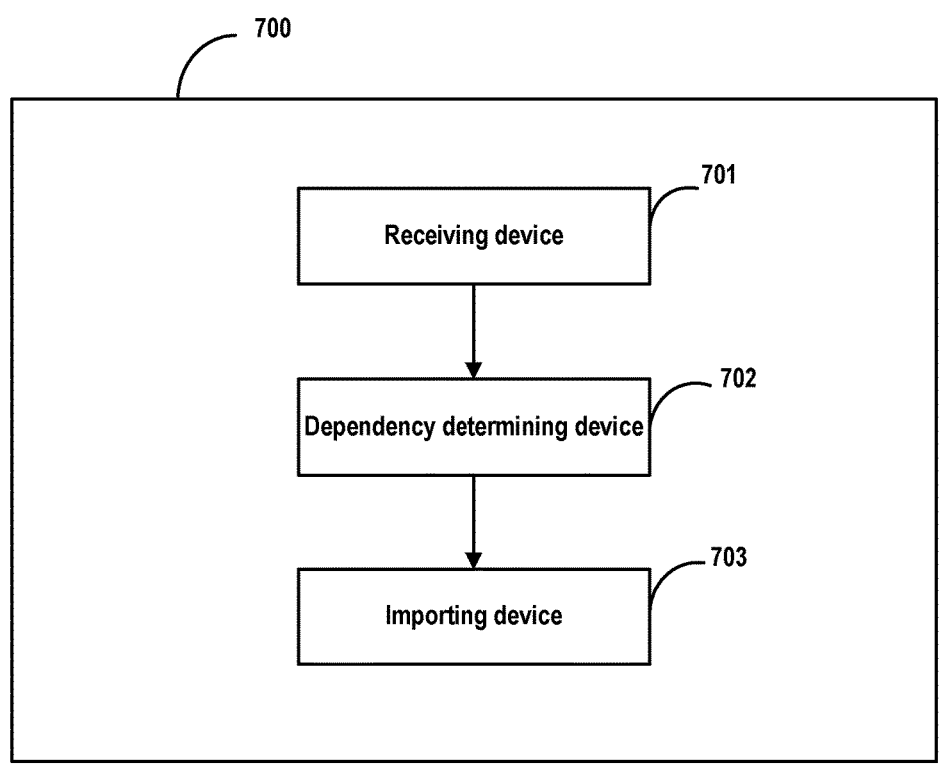
FIG. 7 shows a block diagram of a system for importing E-R model data according to one embodiment disclosed herein.

FIG. 7 shows a block diagram of a system for importing E-R model data according to one embodiment disclosed herein. The system as shown in FIG. 7 is generally represented by system 700. Specifically, the system 700 comprises a receiving device 701 configured to receive an imported E-R model data file and a data schema of the E-R model; a dependency determining device 702 configured to determine a dependency type of each entity in the data file based on the data schema, wherein the dependency type corresponds to at least one of the following: no correlation, weak correlation, or strong correlation; and an importing device 703 configured to correspondingly import each entity in the E-R model data file based on the determined dependency type. In some embodiments, the devices 701-703 in the system 700 correspond to steps 201-203 in the method as shown in FIG. 2 respectively.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments disclosed herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for importing data for an Entity Relationship (E-R) model comprising:
   receiving, via a processor, an exported E-R model data the of the E-R model, wherein the exported ETR model data the is formatted as an Extensible Markup Language (XML) file, an Eclipse Modeling Framework (EMF) file, or a relationship-type database table;
   determining, via the processor, a dependency type of a first entity of the exported E-R model data file, wherein the dependency type of the first entity corresponds to at least one of no correlation, weak correlation, or strong correlation in the exported E-R model data file with respect to an entity type;
   responsive to a determination that the dependency type of the first entity being at least one of weak correlation or no correlation:
      importing, via the processor, the first entity directly in a file in a memory; and determining, via the processor, whether the imported first entity with no correlation or weak correlation causes a restriction requirement of a second entity recorded in a strong correlation table to become satisfied, wherein the second entity is a strongly-correlated entity of the exported E-R model data file, and wherein the restriction requirement comprises a minimum reference number of the strongly-correlated entity;
   responsive to a determination that the imported first entity with no-correlation or weak correlation does not cause the restriction requirement of the second entity to become satisfied, continue storing the second entity and strong correlation reference information in the strong correlation table in the memory unto the minimum reference number of the strongly-correlated entity is satisfied;
   responsive to a determination that the imported first entity with no correlation or weak correlation causes the restriction requirement of the second entity to become satisfied, importing, via the processor, the second entity and then deleting, via the processor, the second entity from the strong correlation table; and
   responsive to all entities in the ER model data file having been completely processed, generating, by the processor, an update request for all rows in a weak correlation table, so as to update the dependency information for each imported entity.

2. The method according to claim 1, further comprising: determining, via the processor, whether the second entity deleted from the strong correlation table needs to be recorded in the weak correlation table; and responsive to a determination that the second entity deleted from the strong correlation table needs to be recorded in the weak correlation table, recording, via the processor, the second entity deleted from the strong correlation table in the weak correlation table.

3. The method according to claim 1, wherein importing the first entity of the exported E-R model data file further includes: responsive to the determined dependency type of the first entity being weak correlation, recording weak correlation reference information of the first entity in the weak correlation table.

4. A computer program product for importing Entity Relationship (E-R) model data, the computer program product comprising a non-transitory computer readable storage medium having program instructions embodied therewith, the program instructions executable by a processor to cause the processor to perform a method comprising:
   receiving, via the processor, an exported ER model data the of the ER model, wherein the exported ER model data file is formatted as an Extensible Markup Language (XML) the, an Eclipse Modeling Framework (EMF) the, or a relationship-type database table;
   determining, via the processor, a dependency type of a first entity of the exported E-R model data file, wherein the dependency type of the first entity corresponds to at least one of no correlation, weak correlation, or strong correlation in the exported E-R model data file with respect to an entity type;
   responsive to a determination that the dependency type of the first entity being at least one of weak correlation or no correlation:
      importing, via the processor, the first entity directly in a file in a memory; and determining, via the processor, whether the imported first entity with no correlation or weak correlation causes a restriction requirement of a second entity recorded in a strong correlation table to become satisfied, wherein the second entity is a strongly-correlated entity of the exported E-R model data the, and wherein the restriction requirement comprises a minimum reference number of the strongly-correlated entity;

responsive to a determination that the imported first entity with no-correlation or weak correlation does not cause the restriction requirement of the second entity to become satisfied, continue storing the second entity and strong correlation reference information in the strong correlation table in the memory until the minimum reference number of the strongly-correlated entity is satisfied;

responsive to a determination that the imported first entity with no correlation or weak correlation causes the restriction requirement of the second entity to become satisfied, importing, via the processor, the second entity and then deleting, via the processor, the second entity from the strong correlation table; and responsive to all entities in the E-R model data the haying been completely processed, generating, by the processor, an update request for all rows in a weak correlation table, so as to update dependency information for each imported entity.

5. The computer program product of claim 4, wherein the processor is further configured to: responsive to the determined dependency type of the first entity being weak correlation, record weak correlation reference information of the first entity in the weak correlation table.

6. A system for importing E-R model data, comprising:
a processor configured to:
receive an exported E-R model data file of an E-R model, wherein the exported E-R model data file is formatted as an Extensible Markup Language (XML) file, an Eclipse Modeling Framework (EMF) file, or a relationship-type database table;

determine a dependency type of a first entity of the exported E-R model data the, wherein the dependency type of the first entity corresponds to at least one of no correlation, weak correlation, or strong correlation in the exported E-R model data file with respect to an entity type;

responsive to a determination that the dependency type of the first entity being at least one of weak correlation or no correlation:
import the first entity directly in a file in a memory; and determine whether the imported first entity with no correlation or weak correlation causes a restriction requirement of a second entity recorded in a strong correlation table to become satisfied, wherein the second entity is a strongly-correlated entity of the exported E-R model data file, and wherein the restriction requirement comprises a minimum reference number of the strongly-correlated entity;

responsive to a determination that the imported first entity with no-correlation or weak correlation does not cause the restriction requirement of the second entity to become satisfied, continue storing the second entity and strong correlation reference information in the strong correlation table in the memory until the minimum reference number of the strongly-correlated entity is satisfied;

responsive to a determination that the imported first entity with no correlation or weak correlation causes the restriction requirement of the second entity to become satisfied, import the second entity and then delete the second entity from the strong correlation table; and responsive to all entities in the E-R model data file having been completely processed, generate an update request for all rows in a weak correlation table, so as to update dependency information for each imported entity.

7. The system according to claim 6, wherein the processor is further configured to: responsive to the determined dependency type of the first entity being the weak correlation, record weak correlation reference information of the first entity in the weak correlation table.

* * * * *